J. H. KARLOFF.
DRAFT EQUALIZER.
APPLICATION FILED APR. 25, 1912.
1,088,662.
Patented Feb. 24, 1914.
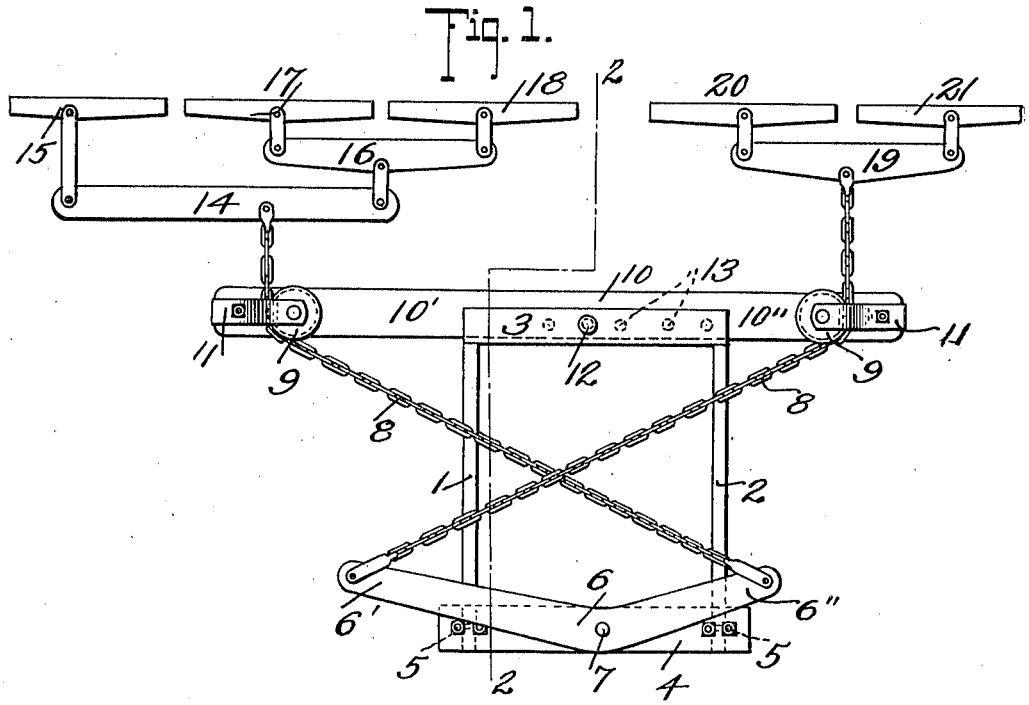
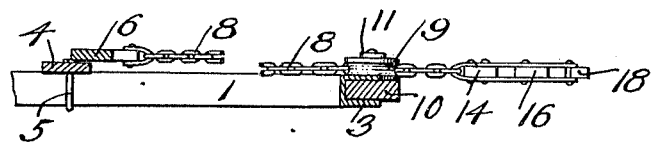
Witnesses
C. H. Wagner.
G. D. Rose.
Inventor
John H. Karloff
By Beeler & Robb
Attorneys

UNITED STATES PATENT OFFICE.

JOHN H. KARLOFF, OF MEAD, NEBRASKA.

DRAFT-EQUALIZER.

1,088,662.  Specification of Letters Patent.  Patented Feb. 24, 1914.

Application filed April 25, 1912. Serial No. 693,099.

*To all whom it may concern:*

Be it known that I, JOHN H. KARLOFF, a citizen of the United States, residing at Mead, in the county of Saunders and State of Nebraska, have invented certain new and useful Improvements in Draft-Equalizers, of which the following is a specification.

As in all draft-equalizers, the main purpose to be accomplished is to provide means whereby each of the draft animals, especially when arranged abreast, may be compelled to do its own equal share of the work, so in my invention it has been my object to devise a construction which will perform this function in the simplest and most efficient manner.

Specifically, my invention embodies an equalizer bar having attached thereto crossed flexible draft connections, or members, to the free ends of which are secured the draft devices and said ends being held in spread or spaced relation by means of a stationary spreader bar provided with pulleys around which said members pass.

While my device is especially adapted for use with gang or sulky plows, it will be evident that it is equally capable of adaptation to any implement where a plurality of animals are employed.

For a full understanding of the present invention, reference is to be had to the following description and the accompanying drawings, in which—

Figure 1 is a top plan view of an equalizer constructed in accordance with my invention; Fig. 2 is a transverse sectional view on the line 2—2 of Fig. 1.

Throughout the following detail description and on the several figures of the drawings, similar parts are referred to by like reference characters.

Referring to the drawings and specifically describing my invention, the numerals 1 and 2 designate the forward ends of the parallel plow beams with which the ordinary gang plow is provided, said beams being connected at their forward extremities by means of the transverse bar 3. At a suitable point in the rear of the bar 3 is a second transverse bar 4 movably secured to the beams 1 and 2 in any desired manner, such as by means of the clips 5, and pivotally mounted on the bar 4 is the equalizer bar 6. Said equalizer bar is preferably curved in the manner shown in the drawings and is pivoted nearer one end on the pivot 7, said pivot being located at the point of curvature and in actual practice approximately forming a long arm 6' of twice the length of the short arm 6''.

Attached to the extremities in any preferred manner are provided the flexible draft connections, or connecting members, 8, which may be rope, chain, or cable wire, as preferred. The connecting members 8 are crossed and pass around the pulleys 9 pivotally mounted at the opposite extremities of the cross, or spreader, bar 10. The spreader bar 10 aforesaid is somewhat longer than the equalizer bar 6 and is provided with the strap irons 11 at each end, secured by means of bolts to said bar 10 and bent upwardly at their free ends, through which the pivots of the pulleys pass, thus affording strengthening means for said pulleys. The connecting members 8 pass between the pulleys 9 and the strap irons 11 so that said members are effectively held in their proper positions.

The transverse bar 3 at the forward end of the beams is somewhat U-shape in cross section with the open portion toward the front of the implement and the spreader bar 10 is received in the U-shape bar and held in position therein by means of the bolt 12. This particular mounting of the spreader bar holds said bar rigidly relative to the equalizer bar 6. A plurality of openings 13 in the bar 10 permit the same to be adjusted transversely for purposes readily understood by those skilled in the art to which this invention appertains, namely, to provide means whereby to increase or decrease the width of the furrow to be turned by the plows, as is accomplished in ordinary constructions by means of a clevis.

The mounting of the spreader bar 10 is such as to provide a long arm 10' and a short arm 10'' proportionate to the lengths of the arms 6' and 6'' of the equalizer bar 6, both of the long arms of said bars being on the same side, as clearly shown in the drawing.

To the free end of the connecting member 8 which passes around the pulley 9 on the long arm 10', is attached the draft device, comprising the evener bar 14, to one extremity of which is attached the singletree 15, while to the opposite extremity is secured the doubletree 16 having at its opposite extremities the singletrees 17 and 18. It will thus be seen that three draft animals are attached to the equalizer on the side of the long arms of the bars 6 and 10, while on the opposite side a doubletree 19 is attached to the connecting member 8, said doubletree last mentioned having the swingletrees 20 and 21 secured to its opposite ends. On this side of the equalizer, therefore, two draft animals are adapted to be attached and by reason of the peculiar coöperation of the rigid spreader bar 10 and pivotally mounted equalizer bar 6, each animal is compelled to bear its own share of the work of drawing the implement.

It will be obvious that the spreader bar holds the connecting members in spaced relation to each other and the fact that the equalizer bar is curved prevents any likelihood of the latter from turning on its pivot into such a position as to throw all of the work upon one side.

The equalizer bar may be easily adjusted forwardly or rearwardly, according to the distance desired between the said bar and the spreader bar at the forward ends of the beams 1 and 2, and the openings 13 in the spreader bar permit a wide adjustment of the same, according to the work to be done. The flexible connections passing around the pulleys on the spreader bar obviously place most of the strain upon the shorter, or equalizer bar, which is advantageous because of the fact that it is less likely to be broken than if rigid connections between the two bars were provided, as has been done in previous devices of this nature.

It is apparent from the foregoing and the illustration in Fig. 1 that the U-shaped members 5 which are removably clamped onto the beams 1 and 2 are adapted for securing the cross bar 4 to said beams 1 and 2 at any desirable point along the length of said beams, whereby the pivot 7 and lever 6 may be adjusted toward and away from the spreader bar 10 and thus vary the amount of cable 8 extending beyond the ends of the spreader bar. It will be perfectly apparent to those skilled in the art that the greater the distance between the trees 14 and 19 and the spreader bar, the greater the opportunity for deflection of the cables with the resultant increase in pitch of the plows connected with the beams 1 and 2. Hence if it is desired to increase the pitch of said plows the bar 4 will be positioned nearer the free ends of the beams 1 and 2, so as to give an increased amount of cable between the spreader bar 10 and trees 14 and 19, but if it is desired to decrease the pitch of said plows the bar 4 will be positioned farther to the rear, thus taking up the excess of cables 8 and accordingly reducing the possible deflection with the consequent tendency to elevate the forward ends of the beams 1 and 2 and the resultant decrease in the pitch of the plow. The variation in width of the furrow obtainable by adjustment of the spreader bar 10 by means of the apertures 13, as above set forth, renders possible adjustment as to width and depth of furrow in conjunction with the equalizing apparatus set forth herein, which adjustments are not obtainable in the usual types of equalizing apparatus.

Having thus described the invention, what is claimed as new is:

In a draft equalizer, the combination of a draft support comprising spaced parallel beams, a U-shaped transverse bar connecting the outer ends of said beams, a second transverse bar mounted on said beams in rear of the U-shaped bar aforesaid, clips connecting the end of the last mentioned bar with the beams for adjustment of said bar longitudinally of the beams, a curved equalizer bar pivoted nearer one end thereof to the rear transverse bar, crossed flexible connecting members attached to the ends of the equalizer bar, a spreader bar provided with a plurality of openings therethrough and mounted in the U-shaped transverse bar aforesaid whereby said spreader bar may be held rigidly at right angles to the beams and adjusted transversely of the same, pulleys mounted on the extremities of said spreader bar and around which the said flexible connecting members aforesaid pass, and draft devices connected to the free ends of the connecting members aforesaid.

In testimony whereof I affix my signature in presence of two witnesses.

JOHN H. KARLOFF.

Witnesses:
JOHN O. FRAHM,
JOHN M. KOLB.

---

Copies of this patent may be obtained for five cents each, by addressing the "Commissioner of Patents Washington, D. C."